United States Patent
Schouppe (10) Patent No.: US 11,316,668 B2
(45) Date of Patent: Apr. 26, 2022

(54) METHODS AND SYSTEMS FOR CRYPTOGRAPHIC PRIVATE KEY MANAGEMENT FOR SECURE MULTIPARTY STORAGE AND TRANSFER OF INFORMATION

(71) Applicant: SafeTech BV, Brussels (BE)

(72) Inventor: Jurgen Schouppe, Vlaams Brabant (BE)

(73) Assignee: SafeTech BV, Brussels (BE)

( * ) Notice: Subject to any disclaimer, the term of this patent is extended or adjusted under 35 U.S.C. 154(b) by 147 days.

(21) Appl. No.: 16/685,624

(22) Filed: Nov. 15, 2019

(65) Prior Publication Data
US 2020/0162246 A1    May 21, 2020

Related U.S. Application Data (60) Provisional application No. 62/935,393, filed on Nov. 14, 2019, provisional application No. 62/768,550, filed on Nov. 16, 2018.

(51) Int. Cl.
*H04L 9/08* (2006.01)
*H04L 9/06* (2006.01)

(52) U.S. Cl.
CPC .......... *H04L 9/0825* (2013.01); *H04L 9/0637* (2013.01); *H04L 9/0894* (2013.01); *H04L 2209/38* (2013.01)

(58) Field of Classification Search
CPC .... H04L 9/0825; H04L 9/0637; H04L 9/0894
(Continued)

(56) References Cited

U.S. PATENT DOCUMENTS 6,868,406 B1  3/2005  Ogg et al.
7,216,110 B1  5/2007  Ogg et al.
(Continued)

FOREIGN PATENT DOCUMENTS

CN    1380610 A    11/2002
CN  106503994 A     3/2017
(Continued)

OTHER PUBLICATIONS

Menezes et al., "Chapter 12: Key Establishment Protocols," Handbook of Applied Cryptography. pp. 489-541 (Oct. 1, 1996) http://www.cacr.math.uwaterloo.ca/hac/.
(Continued)

*Primary Examiner* — Kambiz Zand
*Assistant Examiner* — Phuc Pham
(74) *Attorney, Agent, or Firm* — Downs Rachlin Martin PLLC (57) ABSTRACT

Cryptographic key management systems configured to provide key management services for the secure and decentralized control and storage of private cryptographic keys and other information. Asset private keys, seeds, passphrases, and other digitized information may be split into a plurality of subkeys and distributed to a group of people to allow the group to gain control of the asset private key if and when a specified condition has occurred. In some examples, the group of people receive less than a threshold number of the subkeys required to restore the asset private key and one or more of the subkeys required to restore the asset private key are defined as validator subkeys, the validator subkeys separately and securely stored. In some examples, the validator subkeys are encrypted and the encrypted validator subkeys stored on a blockchain platform.

34 Claims, 3 Drawing Sheets

(58) Field of Classification Search
USPC .......................................................... 713/171
See application file for complete search history.

(56) References Cited

U.S. PATENT DOCUMENTS

| | | | |
|---|---|---|---|
| 7,236,956 | B1 | 6/2007 | Ogg et al. |
| 8,259,950 | B2 | 9/2012 | Nadooshan et al. |
| 9,455,968 | B1 | 9/2016 | Machani et al. |
| 9,489,522 | B1 | 11/2016 | El Defrawy et al. |
| 9,774,578 | B1 | 9/2017 | Ateniese et al. |
| 10,095,549 | B1 | 10/2018 | Needham et al. |
| 10,110,576 | B2 | 10/2018 | Ateniese et al. |
| 10,158,651 | B1 * | 12/2018 | Nimry ................. H04L 63/0435 |
| 2011/0307703 | A1 | 12/2011 | Ogg et al. |
| 2015/0304103 | A1 | 10/2015 | Rebikov et al. |
| 2016/0162897 | A1 | 6/2016 | Feeney |
| 2016/0330244 | A1 | 11/2016 | Denton et al. |
| 2017/0034182 | A1 | 2/2017 | Marson et al. |
| 2017/0236120 | A1 | 8/2017 | Herlihy et al. |
| 2017/0250972 | A1 | 8/2017 | Ronda et al. |
| 2017/0288870 | A1 | 10/2017 | Pryzdatek et al. |
| 2017/0353309 | A1 | 12/2017 | Gray |
| 2018/0091524 | A1 | 3/2018 | Setty et al. |
| 2018/0137299 | A1 * | 5/2018 | Porter ..................... G06F 21/64 |
| 2018/0240086 | A1 | 8/2018 | Sobotka |
| 2018/0241565 | A1 | 8/2018 | Paolini-Subramanya et al. |
| 2018/0276745 | A1 | 9/2018 | Paolini-Subramanya et al. |
| 2018/0285970 | A1 | 10/2018 | Snow et al. |
| 2018/0316495 | A1 * | 11/2018 | Wall ......................... H04L 9/14 |
| 2018/0367298 | A1 | 12/2018 | Cheng et al. |
| 2018/0367316 | A1 | 12/2018 | Wright et al. |
| 2019/0124081 | A1 * | 4/2019 | Nowak ............... H04L 63/0892 |
| 2019/0164156 | A1 * | 5/2019 | Lindemann ........... H04L 9/0894 |
| 2019/0268149 | A1 * | 8/2019 | Kariv ..................... H04L 63/20 |
| 2019/0372765 | A1 * | 12/2019 | Tegeder ................... H04L 9/14 |

FOREIGN PATENT DOCUMENTS

| | | |
|---|---|---|
| CN | 106529932 A | 3/2017 |
| CN | 106548345 A | 3/2017 |
| CN | 108494581 A | 9/2018 |
| EP | 3132560 A1 | 10/2015 |
| EP | 3082124 A1 | 10/2016 |
| EP | 3364328 A1 | 8/2018 |
| GB | 2538022 A | 2/2016 |
| WO | 2016049406 A1 | 3/2016 |
| WO | 2017145010 A1 | 8/2017 |
| WO | 2017149537 A1 | 9/2017 |
| WO | 2017187397 A1 | 11/2017 |
| WO | 2017187399 A1 | 11/2017 |
| WO | 2018020370 A1 | 2/2018 |
| WO | 2018189657 A1 | 10/2018 |

OTHER PUBLICATIONS

Skibinsky, Max et al., "Decentralized Storage of Crypto Assets via Hierarchical Shamir's Secret Sharing." https://vault12.com (Jan. 2018).

Kogure et al., "Blockchain Technology for Next Generation ICT," Fujitsu Sci. Tech. J., vol. 53, No. 5, pp. 56-61 (Sep. 2017).

* cited by examiner

METHODS AND SYSTEMS FOR CRYPTOGRAPHIC PRIVATE KEY MANAGEMENT FOR SECURE MULTIPARTY STORAGE AND TRANSFER OF INFORMATION

RELATED APPLICATION DATA

This application claims the benefit of priority of U.S. Provisional Patent Application Ser. No. 62/768,550, filed on Nov. 16, 2018, and titled "Methods and Systems For Secure Multiparty Storage And Transfer Of Information," and U.S. Provisional Patent Application Ser. No. 62/935,393, filed on Nov. 14, 2019, and titled "Methods and Systems For Cryptographic Private Key Management For Secure Multiparty Storage And Transfer Of Information," each of which is incorporated by reference herein in its entirety.

FIELD OF THE INVENTION

The present disclosure generally relates to the field of cryptographic key management. In particular, the present disclosure is directed to methods and systems for cryptographic private key management for secure multiparty storage and transfer of information.

BACKGROUND

Cryptocurrencies, digital assets, and protection of assets via cryptographic private keys or secrets typically involves the secure storage and use of a private key or secret to gain access to the asset. In cases where assets are protected by a private key, such as the private key of a cryptocurrency wallet, if the key is lost, the protected assets, such as the cryptocurrency may be permanently lost. This potential loss of the secret key or password and loss of corresponding cryptocurrencies hinders the advancement and widespread utilization of digital assets in the modern world. Owners of assets protected by private keys may wish to ensure their assets are not lost in the event of their death or incapacitance by providing some level of access or backup to their heirs while not relinquishing control of their assets until the right time. Similarly, assets may be jointly owned by a group of people that wish to control access to the asset without providing an unequal amount of control in any one member of the group.

SUMMARY OF THE DISCLOSURE

In one implementation, the present disclosure is directed to a method for transferring control of an asset private key from an initiating user to a group of users by use of a key management system, the key management system including a key management computing device configured to provide a web-based key management service and an initiating user computing device. The method includes splitting, with the initiating user computing device, the asset private key into a plurality of subkeys; defining a threshold number, T, of the subkeys that are required to restore the asset private key; identifying a first portion of the subkeys to be transferred to the group of users, wherein a number of the subkeys in the first portion is less than T; identifying at least one of the subkeys as a validator subkey; randomly generating, with the initiating user computing device, a validator private key; encrypting the validator subkey with the validator private key to generate an encrypted validator subkey; storing the encrypted validator subkey on a distributed file system; storing the first portion of the subkeys on at least one storage device; and storing the validator private key on a validator storage device.

In another implementation, the present disclosure is directed to a method of providing a key management service with a key management device for transferring control of an asset private key. The method includes receiving, at the key management device, an asset private key splitting request from an initiating user computing device; and sending, from the key management device to the initiating user computing device, key splitting instructions for execution in a web browser of the initiating user computing device, wherein the key splitting instructions includes splitting the asset private key into a plurality of subkeys with a key splitting algorithm; identifying a first portion of the subkeys for distribution to a plurality of users; identifying a second portion of the subkeys, the second portion including at least one validator subkey; storing ones of the first portion of the subkeys on a plurality of cold storage devices for transfer to the plurality of users; randomly generating a validator asymmetric public-private key pair and passphrase; encrypting the at least one validator subkey with the validator private key; and transmitting the at least one encrypted validator subkey to the key management device for storage on a blockchain platform.

In yet another implementation, the present disclosure is directed to a method of restoring an asset private key from a plurality of subkeys. The method includes sending, with a validator computing device, a restoration request to a key management device to restore the asset private key from the plurality of subkeys; sending, with the validator computing device, confirmation to the key management device that the validator computing device has access to a first number of the subkeys; receiving, at the validator computing device, from the key management device, at least one validator subkey; and restoring, with a restoring algorithm executed by the validator computing device, the asset private key from the first number of the subkeys and the validator subkey; wherein the at least one validator subkey is required to restore the asset private key, wherein the key management device stores an encrypted version of the validator subkey on a blockchain platform and uses blockchain mapping information securely stored by the key management device to locate and accesses the encrypted version of the validator subkey in response to receiving the restoration request and confirmation from the validator computing device.

In yet another implementation, the present disclosure is directed to a method of providing a key management service with a key management device for restoring an asset private key from a plurality of subkeys. The method includes receiving, at the key management device, a restoration request from a validator computing device to restore the asset private key from the plurality of subkeys, the restoration request including a user ID; receiving, from the validator computing device, subkey information for confirming the validator computing device has access to a first number of the subkeys; accessing, with the key management device, group mapping information associated with the user ID; determining whether the group mapping information matches the received subkey information; accessing at least one validator subkey and sending the at least one validator subkey to the validator computing device in response to determining the group mapping information matches the received subkey information; and sending instructions to the validator computing device for restoring the asset private key; wherein the at least one validator subkey is required to restore the asset private key, wherein the accessing the at least one validator subkey includes using the group mapping information for locating and accessing an encrypted version of the at least one validator subkey from a blockchain platform.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

Aspects of the present disclosure include key management systems configured to provide web-based (also referred to as cloud-based) key management services for the secure and decentralized control and storage of private cryptographic keys and/or other information. As described more below, asset private keys, seeds, passphrases, or any other digital data string or data set may be split into a plurality of subkeys and distributed to a group of people that may gain control of the asset private key in the event a specified condition has occurred. In some examples, the group of people receive less than a threshold number of the subkeys required to restore the asset private key and one or more of the subkeys required to restore the asset private key are defined as validator subkeys and separately and securely stored. In some examples, the validator subkeys are encrypted and the encrypted validator subkeys stored on a blockchain platform. An initiating user can select from a plurality of key management programs to determine how the asset private key will be split and how the validator subkey will be stored and accessed.

Figure 1:
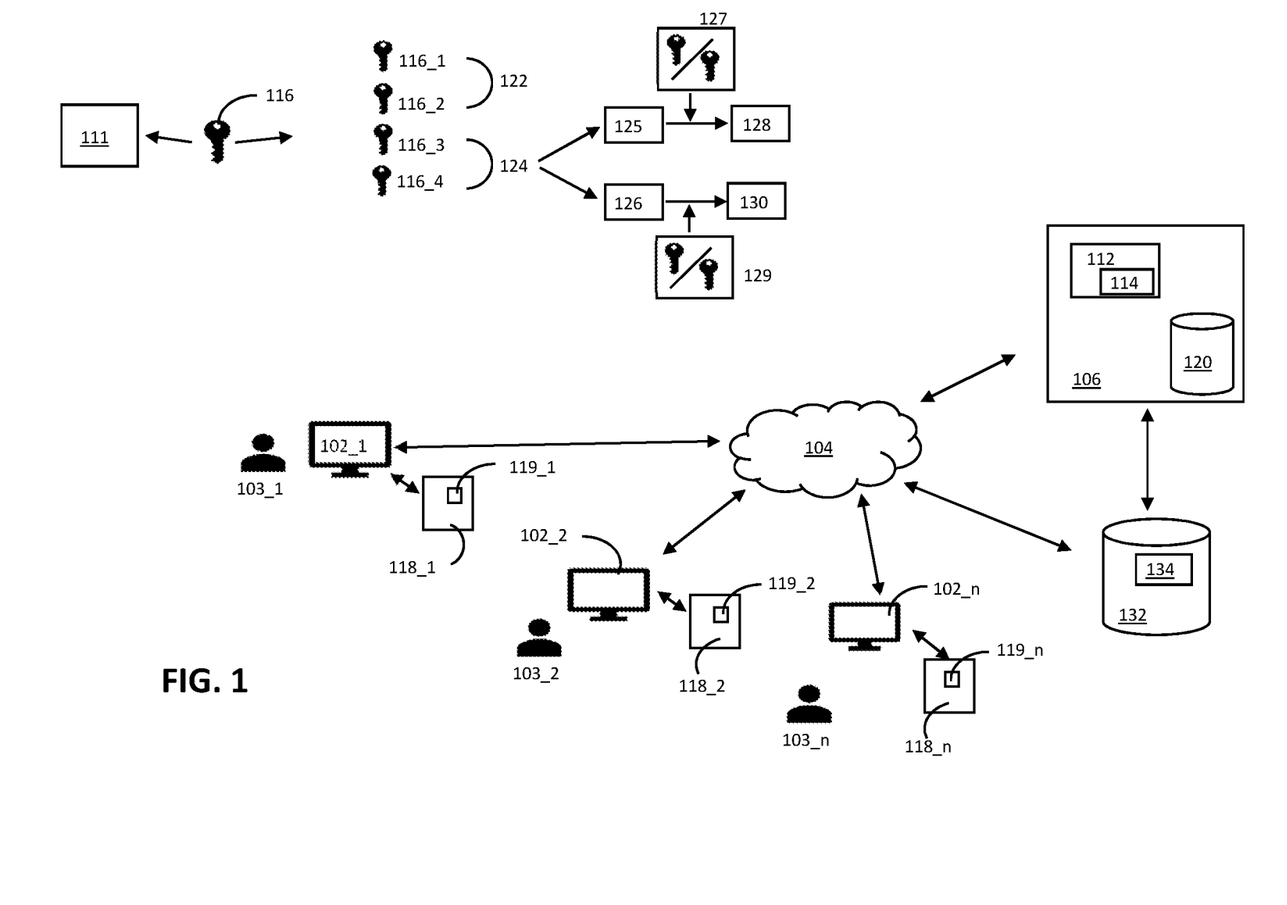
FIG. 1 shows an architecture diagram of an example key management system.

FIG. 1 shows an architecture diagram of an example key management system 100 made in accordance with the present disclosure. System 100 includes a plurality of user computing devices 102_1, 102_2, 102_n of users 103_1-103n, the user computing devices 102 communicatively coupled via a network 104 to a key management device 106 that provides a key management service to users 103 for the secure storage and transfer of assets. System 100 is designed and configured to securely store an asset private key 110, which is a cryptographic key, seed, passphrase, or other digital data string that is used to gain access to an asset 111, to ensure the asset private key is never permanently lost and that it is only accessed under authorized conditions. System 100 may also be used to securely store any type of information, such as any secret that is used to secure an asset, for example, a private key of a cryptographic asymmetric public-private key pair, a password, passphrase, or any other digital data string, including any word or combination of words, or other digital data file, such as a digital image, etc. An asset, as the term is used herein, can be anything secured by a secret, such as an asset private key, for example, cryptocurrency, or information of any kind. Key management device 106 may be any of a variety of computing devices known in the art and may include software 112 that includes instructions for executing one or more key distribution protocols 114 as described herein. Key distribution protocols 114 may include instructions for executing a splitting algorithm to split asset private key 110 into a plurality of subkeys 116_1 to 116_n and for distributing and storing the plurality of subkeys. The splitting algorithm may include information defining a minimum threshold number, T, of the subkeys 116 that are required to restore the asset private key 110. In the illustrated example, system 100 includes a plurality of cold storage devices 118_1, 118_2, 118_n that may be used to securely store one or more of subkeys 116 until they are needed to restore asset private key 110.

Key management device 106 may be configured to provide a key management service and to communicate with user computing devices 102 to cause the user devices to perform one or more functions of key management as described herein. Key management device 106 may include a database 120 for storage of certain information associated with users 103 in connection with providing key management services. In some examples, key management device 106 is configured to provide a decentralized key management service, where neither the asset private key 110 or subkeys 116 are accessed or stored by the key management device or associated database 120. Instead, the key management device 106 may only store minimal group mapping information to facilitate the key management service while providing instructions to one or more of user devices 102 to perform functions of key splitting, encryption, and storage. As described more below, key management device 106 may be configured to identify, or cause a user device 102 executing key distribution protocol 114 to identify, a first portion 122 of subkeys 116 as user subkeys and a second portion 124 of subkeys 116 as validator subkeys 125 and in some examples, backup subkeys 126, wherein a number of subkeys 116 in the first portion 122 of subkeys is less than the threshold, T, so that the users cannot restore the asset private key without access to the second portion 124 of subkeys 116. The first portion 122 of subkeys 116 can be distributed to one or more of users 103 for storage on user computing devices 102 and/or cold storage devices 118. For example, in a case where user 103_1 is an initiating user that initially owns and/or controls asset private key 110, the first portion 122 of subkeys 116 may be transferred to one or more of the other users 103 so that if the initiating user 103_1 loses the asset private key 110 or if the initiating user 103_1 dies or becomes incapacitated, the other users 103 can use system 100 to restore the asset private key 110 to gain access to the asset 111.

Key management device 106 and/or user computing devices 102 may also be configured to encrypt the second portion 124 of subkeys 116 to form encrypted validator subkeys 128 and in some examples, encrypted backup subkeys 130, and transfer the encrypted validator and/or backup subkeys 128, 130 to a blockchain platform 132 for storage. For example, key management device 106 may be configured to provide instructions to blockchain platform 132 to execute one or more smart contracts 134 stored or accessible by the blockchain platform for storing the encrypted validator subkeys 128 and backup subkeys 130 on blockchain platform 132. Blockchain platform 132 may also include a plurality of blockchain platforms, for example, system 100 may be configured to separately store the encrypted validator subkeys 128 and backup subkeys 130 on multiple blockchain platforms for redundancy and in the event of congestion issues with a particular blockchain platform. In other examples, encrypted validator subkeys 128 and backup subkeys 130 may also be stored on any of a variety of other storage systems, for example, a distributed file system, such as the Inter Planetary File System (IPFS), which is a protocol and peer-to-peer network for storing and sharing data in a distributed file system. As described more below, one of users 103 can be identified as a validator that controls the release of the encrypted validator subkeys 128 and backup subkeys 130 via decryption of the encrypted subkeys. In some examples, the validator may be selected by the initiating user and may be a trusted third party agent, such as a law firm, or may be one of a group of users 103, such as the eldest child or trustee. In yet other examples, key management device 106 may serve the function of the validator for automated release of the encrypted validator subkeys 128 and backup subkeys 130 when specified conditions are met.

Key distribution protocols 114 may include instructions for the initial splitting, encryption, and storage of asset private key 110 as well as instructions for authorizing the release of the encrypted validator subkeys 128 and backup subkeys 130 stored on blockchain platform 132 when certain conditions have been satisfied, according to a particular key distribution protocol 114. By distributing less than the threshold number, T, of subkeys to users 103, the users cannot restore the asset private key 110 without accessing a required number of the second portion 124 of subkeys 116 stored on blockchain platform 132. System, 100, therefore, provides a decentralized system and protocol for allowing one of users 103 to relinquish or share control of asset private key 110 while at the same time preventing a group of users 103 from gaining access to the asset private key 110 prematurely or without the authorization of the initiating user.

User computing devices 102 and key management device 106 may each include any computing device hardware and architecture known in the art, such as those configurations used in laptops, desktops, servers, mobile phones, and tablets, etc. Network 104 may include any one or more computer networking technologies and topologies known in the art, including local area networks and communication via the internet. For example, key management device 106 may be configured to provide a cloud or internet-based key management service via network 104 and user computing devices 102 may be configured to access key management device 106 and perform one or more aspects of key distribution protocols 114 via web browser software stored locally and/or accessed by the user devices. Cold storage devices 118 may be configured for secure long-term storage of subkeys 116. For example, cold storage devices 118 may be computing devices that include a memory and in some examples, a processor configured to encrypt data, such as subkeys 116, stored thereon, for example, with one or more cold storage device cryptographic keys 119. In some examples, cold storage devices may also be configured to store identification information and execute an authentication procedure to authenticate the cold storage device. In some examples, cold storage devices 118 may be encrypted USB thumb drives. In some examples, cold storage devices may be configured to communicate with user computing devices 102 via any communication protocol known in the art, such as USB, NFC, Zigbee, or WiFi, etc.

In some examples, one or more of cold storage devices 118 are a hardware dongle that incorporates Universal 2nd Factor (U2F) and Fast ID Online (FIDO) authentication and communication standards. In one example, cold storage devices 118 are compliant with one or more FIDO protocols, for example, the FIDO2 protocol. Cold storage devices may include a storage data structure similar to a key-value store where there is no rigid structure for data, except, in some examples, an ID field. In one example, cold storage devices 118 allow the storage of 80 data records of up to 480 bytes capacity, including an ID field, and small storage structure overhead. Data on cold storage devices 118 may be encrypted, for example, with AES256, and in some examples, accessible only after a user provides a correct PIN. In some examples to facilitate ease of use, the PIN used to access encrypted data is the same or shared with the authentication protocol, e.g., a FIDO2 PIN application. Cold storage devices 118 may be connected to one of user devices 102 and store data as received from the user device, and in some examples, encode the received data in a Concise Binary Object Representation (CBOR) data structure. Cold storage devices 118 may utilize a FIDO U2F transport layer, which facilitates backward-compatibility and communication over a variety of internet web browsers. Encryption of data stored on the cold storage devices may incorporate any encryption technology known in the art. In one example, cold storage devices include a sector-addressable memory and incorporate block cipher-based disk encryption, such as 256-bit AES-CBCESSIV. Cold storage devices 118 keys 119 may include a master encryption key that is wrapped by AES256-CBC with an encryption key derived from a user PIN, for example, derived using a Password-Based Key Derivation Function 2 (PBKDF2) hash from RSA Laboratories' Public-Key Cryptography Standards (PKCS) series. In one example, cold storage devices 118 include an encryption scheme that is a variation of 256-bitAES-CBC-ESSIV, with data slot index-derived IV, wherein each slot of data is encrypted with the same AES key, but with an IV quasi-randomized per slot, for given AES key instance. Cold storage devices 118 may be configured to randomly generate an AES key for encryption of internal storage the first time the cold storage device is used. Thus, when cold storage device 118 is at rest, full security and confidentiality of the information stored thereon can be guaranteed. In some examples, cold storage devices 118 are configured to utilize a U2F protocol as a secure U2F tunnel that creates a cryptographically secure second factor mechanism for transfer of information. During a registration phase, cold storage devices 118 generate a keypair over the prime256v1 curve and exchange the public key from the keypair, an encrypted version of the private key, referred to as a key handle, and an attestation demonstrating that the private key was generated on a trusted device, to key management device 106. During an authentication phase, key management device 106 may generate a random value as an authentication challenge and then send the challenge and the key handle to the corresponding cold storage device 118. The cold storage device 118 can decrypt the key handle to retrieve the private key from the key handle, use the private key to sign the challenge and return the challenge signature. The key management device 106 can then validate the challenge signature and authenticate the cold storage device 118.

Blockchain platform 132 may include any architecture known in the art, including, for example, a service layer, a smart contract layer and an underlying blockchain layer. Blockchain platform 132 may be a public or private blockchain or a combination thereof. In some examples, blockchain platform 132 is a public blockchain such as Ethereum/VeChain or any other public blockchain configured to support smart contracts. In other examples, blockchain platform 132 may be a private blockchain, however, in such cases transactions can not be publicly verified.

Key management device 106 and/or one of user computing devices 102 may be configured to split asset private key 110 into subkeys 116 using any splitting algorithm known in the art, such as any cryptographic secret sharing algorithm, such as Shamir's Secret Sharing, Blakley's scheme, or the Chinese remainder theorem, among others. In some examples, asset private key 110 may be split into a plurality of subkeys 116 with the following example splitting polynomial (1):

$$f(x) = A_0 + A_1*X + A_2*X^2 + \ldots + A_{T-1}*X^{T-1} \qquad \text{Eq. (1)}$$

wherein:

$A_0$ is the secret, e.g., asset private key 110;

$A_1$-$A_{T-1}$ are random numbers, which may be randomly generated by the key management device 106 and/or one of user computing devices 102 executing Equation 1; and T is the minimum number of subkeys 116 required to restore the asset private key 110.

Equation 1 may be used to create n subkeys 116, such that for i=1, n, each subkey is defined as (i, f(i)). For example, if Equation 1 were used to create three subkeys 116, the subkeys would be calculated as follows: subkey 1 (1, f(1)); subkey 2 (2, f(2)); and subkey 3 (3, f(3)).

Key Management Programs And Key Distribution Protocols

Key management device 106 may be configured to offer various key management plans to users 103. A non-limiting example is an inheritance plan, where the owner of an asset 111 splits a private key 110 for accessing his or her assets into subkeys 116, where a threshold, T, of the subkeys are required to restore the private key, and delivers a first portion, y, of the subkeys to his or her heirs and a second portion of subkeys to a validator, wherein y<T. In some examples, the owner may elect to split the second portion 124 of subkeys 116 into both validator subkeys 125 and backup subkeys 126 as described herein, the backup subkeys used in the event one of the heirs loses his or her subkeys.

Under the inheritance plan, the owner can authorize the validator to release the second portion 124 of the subkeys 116 when one or more conditions have been met, such as verification that the original owner has passed away. And in examples where the owner chose to include backup subkeys 126, the owner can also specify conditions for when the validator is authorized to release the backup subkeys. For example, only when the first condition has been met, e.g., confirmation of death, and a second condition is met, e.g., one of the heirs providing confirmation of his or her identify, for example, by connecting his or her cold storage device 118 and providing authentication information, and submitting a request to use the backup subkeys. System 100 may, therefore, be used to provide a secure mechanism for transferring asset private key 110 or any other secret information to one or more people at a later date without relinquishing control by the owner to the one or more people until a certain condition has been met. In the inheritance example, the owner maintains control of his or her assets until he or she dies by giving the heirs less than all of the subkeys required to restore the private key 110 and entrusting the remaining subkeys required to meet the threshold T with the validator.

Table 1 shows examples of numbers of subkeys 116 that may be created and allocated as a function of a specified number of heirs, validators, and backup subkeys. In the illustrated examples, the validator is given one less subkey than each of the heirs so that the validator could not replace one of the heirs and restore the private key 110 without the permission of one of the heirs. For example, column A shows a scenario where there is one heir and one validator. Because the heir receives more subkeys than the validator, the heir receives 2, the validator 1, and T is set at 3 so that the heir cannot reconstruct the private key without the validator's subkey. Column B shows an example including two heirs and one validator, resulting in a threshold of 7 subkeys. Column C shows an example where additional backup subkeys are created. And column D shows an example where two validators are specified. For example, extra security may be provided by requiring two independent validators to independently confirm a specified condition has been satisfied and subkeys from heirs plus both validators required to restore the private key.

KCM: I think it makes sense to leave it as 3 to each heir and 2 to each validator to keep with the general rule of one less to each validator (see table below, let me know if you have changes)

TABLE 1

Example Numbers of Subkeys

| | A | B | C | D |
|---|---|---|---|---|
| Number of heirs | 1 | 3 | 3 | 3 |
| Number of validators | 1 | 1 | 1 | 2 |
| Number of backup subkeys 126 | 0 | 0 | 2 | 0 |
| Number of subkeys 116 provided to each heir | 2 | 2 | 2 | 2 |
| Total number of first portion 122 of subkeys 116 provided to heirs | 2 | 6 | 6 | 6 |
| Number of subkeys 116 provided to validator(s) | 1 | 1 | 1 | 2 |
| Total number of subkeys 116 | 3 | 7 | 9 | 8 |
| Minimum threshold, T, of subkeys 116 required to restore private key 110 | 3 | 7 | 7 | 7-8 |

Applications of system 100 are not limited to inheritance. Other examples include a business continuity plan. For example, one or more owners can use system 100 to allow for a future transition of control to a group of one or more stakeholders by transferring to the stakeholders less than a threshold number of subkeys 116 and entrusting the remaining subkeys 116 to a validator. The specified condition for releasing the validator subkey(s) 125 may be any of a variety of events, such as the closing of a merger or acquisition. In yet another example, a group of people may wish to jointly own an investment, such as a portfolio of cryptocurrencies, but prevent one or a subset of the individuals from gaining access to the portfolio without unanimous or some other threshold level of consent. Referring to FIG. 1, in an example where users 103 jointly own the portfolio, one or more of the users can open an account with a key management service via key management device 106 and specify the number of users in the group and the minimum threshold number, T of subkeys 116 required to gain access to private key 110, as well as the one or more conditions required to regain control of the key. The condition may simply be a unanimous request from all users to regain access.

Figure 2:
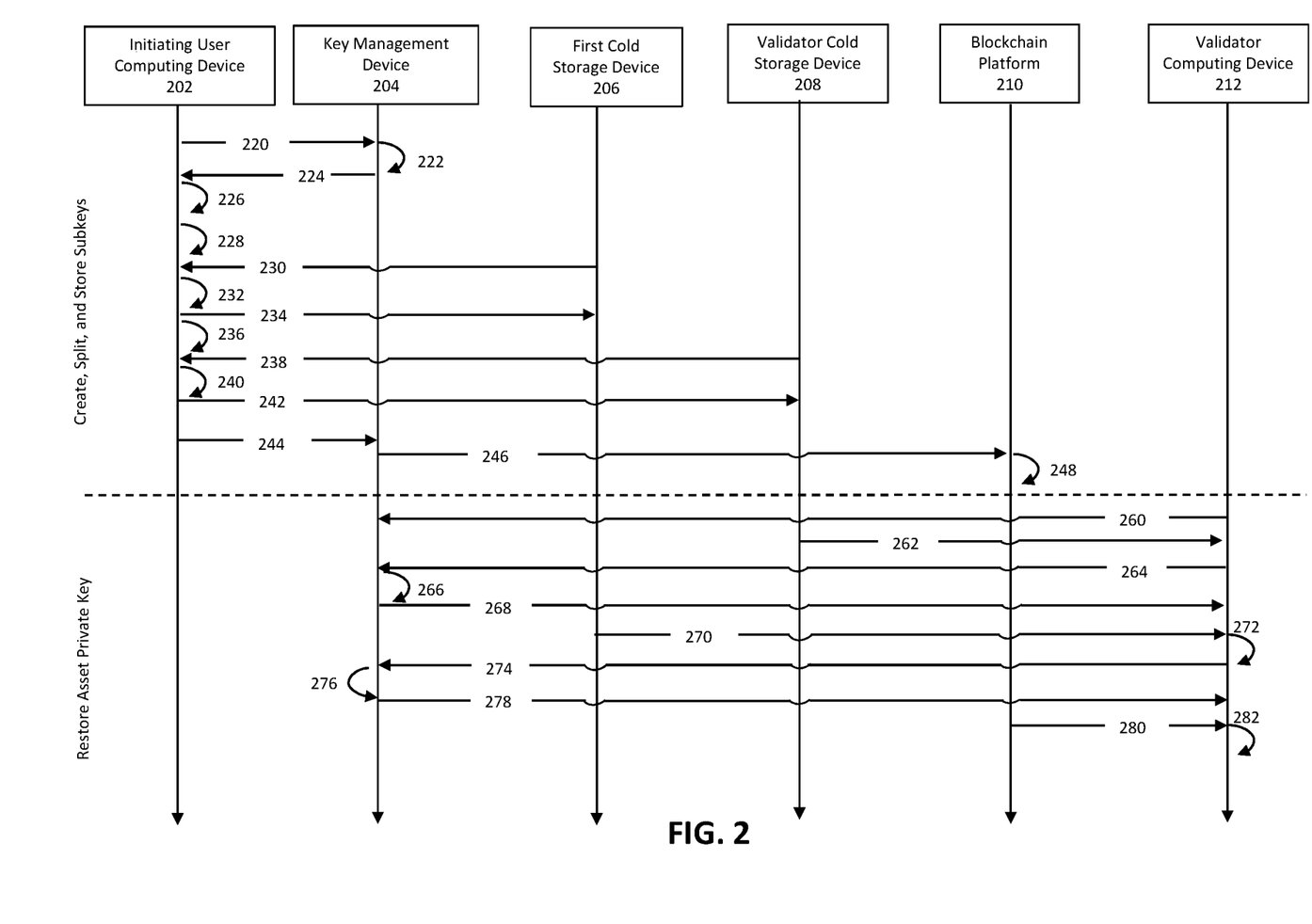
FIG. 2 is a data flow diagram of functions performed a key management system in accordance with aspects of the present disclosure.

FIG. 2 is a data flow diagram of functions performed a key management system 200 performed in accordance with aspects of the present disclosure. In the illustrated example, various acts are performed by an initiating user computing device 202, a key management device 204, a first cold storage device 206, a validator cold storage device 208, a blockchain platform 210, and a validator computing device 212. Key management system 200 is an example application of key management system 100, where initiating user computing device 202 and validator computing device 212 may correspond to ones of user computing devices 102 (FIG. 1), key management device 204 may correspond to key management device 106, first cold storage device 206 and validator cold storage device 208 may correspond to ones of the cold storage devices 118, and blockchain platform 210 may correspond to blockchain platform 132. The illustrated example includes a plurality of phases or stages, including (1) creating a key management program account, (2) splitting a private key into a plurality of subkeys, assigning and storing the subkeys, and (3) restoring the private key. Methods performed in accordance with the present disclosure may include additional acts that are not illustrated or described, or may omit or modify one or more of the illustrated acts, including changing the order from the order illustrated herein.

Creating A Key Management Program Account

Creation of a new key management program account may be initiated by an initiating user at an initiating user computing device 202. For example, an initiating user may be one of users 103 (FIG. 1) and may be the owner of a cryptocurrency portfolio, e.g., asset 111 (FIG. 1) and that wishes to create a key management program to conditionally transfer ownership and control of a private key, e.g., asset private key 110, required to access the cryptocurrency portfolio, to his heirs, e.g., other ones of users 103. At step 220, at the initiating user computing device 202, for example, with a web browser installed on or accessible by the user computing device, may connect via network 104, such as the internet, to key management device 204 to create a new key management program. Creation of a new program may include requesting to create new group, selecting a key management program, and providing group information. Initiating user computing device 202 and key management device 204 may be configured to communicate over network 104 via any communication protocol known in the art, such as HTTPS or FTP, and the key management device may cause one or more webpages including webpages containing user interfaces to be displayed on the initiating user computing device 202.

Selection of a key management program may include one or more of selecting, via a web browser on the initiating user computing device 202, (1) a type of key management program, such as an inheritance plan, a business continuity plan, an investment circle plan, etc.; (2) specifying a number and type of validators, such as whether a third party validator, such as a law firm, will be used or if one of the members of the group will be assigned as a validator, or whether the key management device will serve the function of the validator; (3) specifying the condition(s) that must be satisfied for the validator(s) to release the validator subkeys 125; and (4) the mechanics by which the condition is verified, such as automatically or by requiring some human interaction, such as review of a death certificate, among any of a variety of other parameters. Key management device 204 may also prompt the initiating user to specify group information, such as the number of users, e.g. users 103 (FIG. 1) in the group, and any other identifying information for the users, such as user names.

Key management device 204, at 222, may create a new group, assign a group ID and user IDs and create mapping information for the group for mapping users 103 and associated user IDs to a particular group ID and may also determine one or more asset private key splitting parameters, such as a number of subkeys 116, a number of a first portion 122 of the subkeys that will be distributed to users 103 in the group, a number of a second portion 124 of the subkeys that will be controlled by one or more validators, and in some examples, a number of the second portion may be used as backup subkeys 126. At 224, key management device 204 may prompt initiating user computing device 202, e.g., via the web browser on the user device, to upload or otherwise make available the asset private key 110 that the initiating user would like to split and securely store and manage. At 224, key management device 204 may also provide asset private key splitting instructions. At 226 the imitating user device 202, e.g., via a web browser or other program running locally on the initiating user computing device may receive the asset private key 110 uploaded by the initiating user and execute one or more splitting algorithms according to the received key splitting instructions, such as an algorithm that executes Equation (1) according to the asset private key splitting parameters received from the key management device, to generate a plurality of subkeys 116 that are temporarily stored locally on the initiating user computing device. For example, key management device 204 may provide instructions for executing a key splitting algorithm in JavaScript executable by a web browser of the initiating user computing device 202. At 228, after the plurality of subkeys 116 are generated, the web browser may be configured to prompt the initiating user to connect a first cold storage device 206 for storing one or more of the subkeys.

At 230, initiating user may connect the first cold storage device 206 to the initiating user computing device 202 and after connection, the first cold storage device and initiating computing device may initiate a communication session using any authentication and communication protocol known in the art, such as authenticating the browser on the initiating user computing device, and providing cold storage device credentials or other authentication information for identifying and authenticating the first cold storage device to the browser. The cold storage device credentials may include a cold storage device public key of an asymmetric key public-private key pair. At 232, the initiating user may be prompted to select one of the users previously defined at step 220 and 222 as the owner of the first cold storage device 206. The initiating user computing device 202 may also be configured to identify a first number of the subkeys 116 to assign to the first cold storage device 206, encrypt the identified first number of subkeys with the cold storage device public key, and perform a cryptographic hash calculation of each assigned subkey 116 to generate a hash of each subkey assigned to the first cold storage device 206. At 234, the initiating user computing device 202 may transfer the encrypted first number of subkeys 116 to the first cold storage device for secure long term storage.

Steps 228-234 may be repeated for each cold storage device 206. For example, if the initiating user specified three heirs, one validator, and no backup subkeys (Example B in Table 1 above), steps 228-234 may be repeated three times, transferring two encrypted subkeys to each cold storage device 206. The cold storage devices 206 can then be physically delivered to the three heirs for safe keeping.

At step 236, the initiating user computing device 202, for example, via JavaScript in a web browser, or other locally executed software, may identify one or more of the subkeys 116 as validator subkeys 125 that will be controlled by a validator, and the initiating user computing device may be configured to randomly generate an asymmetric public-private validator key pair and passphrase 127 (FIG. 1) with any asymmetric key derivation function known in the art, and encrypt the identified validator subkeys 125 with the validator public key to form encrypted validator subkeys 128. The initiating user device may also generate a hash-calculated value of validator subkeys 125.

In one example, storage and control of the encrypted validator subkeys 128 and validator key pair and passphrase 127 may vary according to the key management protection plan selected by the initiating user. For example, if the initiating user opts to use a trusted third party, such as a law firm, or one of the users 103, such as the oldest or most responsible child, to be the validator, then the validator key pair and passphrase 127 may be stored on the validator cold storage device 208 and/or validator computing device 212. At 238, the initiating user may connect the validator cold storage device 208 to the initiating user computing device 202 and after connection, the validator cold storage device and initiating user computing device may initiate a secure communication session using any protocol known in the art, such as authenticating the browser, and providing cold storage device credentials or other authentication information for identifying and authenticating the validator cold storage device to the browser. The cold storage device credentials may include or be based on a cold storage device public key of an asymmetric public-private key pair 119. At 240, in cases where there is more than one validator, the initiating user may be prompted to select one of the validators previously defined at step 220 and 222 as the owner of the validator cold storage device 208. At 242, the initiating user device may transfer the asymmetric public/private validator key pair and passphrase 127 and the hash of the validator subkeys 125 to the validator cold storage device 208 for secure long term storage for future use to decrypt the encrypted validator subkeys 128 stored on blockchain platform 210 as described below. In other examples, only the validator key pair 127 may be transferred to the validator cold storage device 208 and the passphrase for decrypting and using the private key of the key pair 127 may be transferred to key management device 204 so that control of the encrypted validator subkeys 128 is split between the validator and the key management device.

In other examples, the validator subkeys 125 may be encrypted with a public key of a private-public key pair 119 of a validator cold storage device 208 and stored on the validator cold storage device in a manner similar to the first portion 122 of subkeys 116 assigned to members of the group. In cases where a key management program selected by the initiating user includes more than one validator, steps 236-242 may be repeated for each validator cold storage device 208. The validator cold storage devices can then be physically delivered to the validator(s).

In other examples, the initiating user may select the key management device 106 as the validator, for example, if he/she wants a more automated process and/or doesn't want to involve a third party or assign the validator role to one of the users. In such cases, instead of performing steps 238-242 to store validator key pair and passphrase 127 on a cold storage device, initiating user computing device 202 may transmit the validator key pair and passphrase 127 to key management device 204 for secure storage in database 120.

In examples where a key management program selected by the initiating user includes backup subkeys 126, steps similar to steps 236-242 can be performed to generate an asymmetric public/private backup subkey key pair and passphrase 129, encrypt the identified backup subkeys 126 with the generated backup public key to generate encrypted backup subkeys 130, generate a hash-calculated value of the backup subkeys 126, and prompt the initiating user to connect a backup cold storage device for storing the asymmetric public-private backup key pair 129 for future use to decrypt the encrypted backup subkeys 130 stored on blockchain platform 210.

At 244, the initiating user computing device 202 can also send updated group mapping information to the key management device 204 for recording the transfer of the subkeys 116 to the users 103. Table 2 summarizes example group mapping information that may be transferred by the initiating user computing device 202 to the key management device 204 for storage in a memory, such as a database 120. As shown in Table 2, in one example, key management device 204 and corresponding database 120 do not receive or store the asset private key 110 or any of the subkeys 116, or any personal information of any user (although the example shown below includes user name, this for convenience only and may be omitted for complete anonymity). In examples where key management device 204 acts as the validator, the group mapping information can also include the validator key pair 127 and in some examples the backup key pair 129 for decrypting encrypted validator subkeys 128. The validator key pair 127 may be securely transferred using any secure transmission technique, such as encrypting the validator key pair 127 with a public key provided by the key management device.

TABLE 2

| Group ID | ### |
| --- | --- |
| Key Management Program | ### |
| Number of users | ### |

| Validator Name | Validator ID | Validator Cold Storage Device ID | Hash of Validator subkeys | Passphrase | Blockchain location of encrypted validator subkey |
| --- | --- | --- | --- | --- | --- |
| Validator 1 | ### | ### | ### | ### | ### |

| Backup subkey Cold Storage Device ID | Hash of backup subkeys | Passphrase | Blockchain location of encrypted backup subkeys |
| --- | --- | --- | --- |
| ### | ### | ### | ### |

| User Name | User ID | Cold Storage Device ID | Hash of assigned subkeys |
| --- | --- | --- | --- |
| User 1 | ### | ### | ### |
| User 2 | ### | ### | ### |
| User N | ### | ### | ### |

At 244, the initiating user computing device 202 can also send encrypted validator subkeys 128 that were encrypted with a corresponding validator private key of a key pair 127 to the key management device 204. If there are any backup keys 126, the initiating user computing device 202 can also send encrypted backup subkeys 130 that were encrypted with a corresponding backup public key of a key pair 129. At step 246, the key management device 204 can send the encrypted validator subkeys 128 and encrypted backup subkeys 130 to the blockchain platform 210. At 248, the blockchain platform may be configured to execute one or more smart contracts 134 for writing the encrypted validator subkeys 128 and encrypted backup subkeys 130 to the blockchain for secure storage. Key management device 204 and/or smart contracts 134 may also be configured to store blockchain mapping information, such as the Group ID # (see Table 2) on blockchain platform 210 with the encrypted validator subkeys 128 and encrypted backup subkeys 130 to later access the encrypted validator subkeys 128 and encrypted backup subkeys 130 from the blockchain platform. In some examples, the mapping information, such as the Group ID #, used for associating a blockchain platform transaction with a particular group is securely stored by key management device 204 and not shared with any of users 103. By securely storing the blockchain mapping information, the encrypted validator subkeys 128 and encrypted backup subkeys 130 are hidden in plain sight from the public, including users 103 including the validator. For example, in cases where a public blockchain is used, key management device 204 can publicly store the encrypted data strings representing encrypted validator subkeys 128 and encrypted backup subkeys 130 on the public blockchain, but without the blockchain mapping information, the validator or other person that wished to decrypt the encrypted validator subkeys 128 or encrypted backup subkeys 130 will not be able to tell which data string recorded to the blockchain platform represents the particular encrypted validator subkeys 128 and encrypted backup subkeys 130 he or she needs to restore a particular asset private key. By storing the encrypted validator subkeys 128 and encrypted backup subkeys 130 on a decentralized medium, such as block chain platform 210, users 103 do not need to provide any subkeys 116 to a third-party validator and only heirs or stakeholders receive a physical share, for example via receipt of a cold storage device 118 storing one of subkeys 116. Heirs/stakeholders, can therefore rely on a third party, such as a legal entity to release encrypted validator subkeys 128 and/or encrypted backup subkeys 130 from block chain platform 210, for example, by validating a death certificate or some other encoded condition that needs to be verified by the legal entity, without giving the third party any of subkeys 116. Further, only the key management device 204 can release the encrypted validator subkeys 128 and encrypted backup subkeys 130 from the blockchain platform because the blockchain mapping information is secretly and confidentially stored by the key management device as described above. In some examples, the validator must verify to the key management device 204 that it has consent from a minimum required number of heirs or stakeholders by demonstrating the validator has access to a minimum number of subkeys 116 required to restore the asset private key before the key management device 204 uses group mapping information stored locally, e.g., in database 120 (FIG. 1) to identify the particular encrypted validator subkeys 128 and/or encrypted backup subkeys 130 stored on the blockchain platform 132 needed to restore the asset private key.

System 100, therefore, provides a decentralized method and system of splitting an asset private key 110 and storing the resulting subkeys 116 for future use in restoring the asset private key that is extremely resistant to hacking or tampering. For example, in the illustrated example, key management device 204 is configured to provide and manage a web-based key management service, but never has access, even on a temporary basis, to asset private key 110. Instead, all steps of accessing, splitting, and encrypting the resulting subkeys are performed at the initiating user computing device 202, for example, in a web browser software application running locally on the initiating user computing device 202. In examples where the key management device 204 is not used as the validator, the key management device also never has access to the private keys of the key pairs 119 of the cold storage devices 206, 208 or the private key of the key pairs 127, 129 generated by the initiating user computing device 202 that are used to encrypt the validator and backup subkeys 125, 126 before storing the encrypted validator and backup subkeys 128, 130 on blockchain platform 132. Instead, key management device 106 securely and confidentially stores mapping information required to coordinate the future restoration of asset private key 110 by being able to determine the storage location on the blockchain platform for a particular encrypted validator subkeys 128 and/or encrypted backup subkeys 130 required to restore the asset private key. As noted above, in some examples, key management device 204, rather than validator cold storage device 208 also stores the passphrase required to use the validator key pair 127 to further prevent the unauthorized restoration of the asset private key by either the validator or key management device 106. In some examples, where key management device 204 is selected as the validator, the key management device also stores the validator and backup key pairs and passphrases 127, 129. In yet other examples, key management device may store just the validator or backup key pairs and passphrases and a third party, such as one of users 103 may store the other one of the validator and backup key pair and passphrase.

Restoring the Asset Private Key

In one example, to restore the asset private key 110, the restoration process may be initiated by the validator at the validator computing device 212 because the validator was charged with verifying the condition initially specified by the initiating user for restoring the asset private key. Thus, the restoration process may be initiated at step 260 by a validating user connecting, with the validator computing device 212 to the key management device 204, providing authentication information to the key management device 204 and providing a restoration request indicating that the validator wishes to restore the asset private key. Prior to step 260, the user 103 selected as the validator (e.g., an heir, stakeholder, or third party such as legal entity) may perform any of a variety of verification steps to confirm the condition for key restoration has occurred. For example, review and verification of a death certificate for the initiating user or other original owner of the asset private key 110, a court order of incapacitance of the original owner, an executed legal agreement indicating the occurrence of an event, such as a merger or acquisition, or a request from a minimum number of users 103, e.g., a majority, or all of the users, to restore the key.

After connecting to the key management device 204 at 260, in some examples, the validator may then be prompted to connect the validator cold storage device 208 to the validator computing device 212 and, as described above, the validator cold storage device may be configured with an authentication protocol, such as a FIDO authentication protocol for sending, at 262, authentication information to the validator computing device, which, at 264, is in turn sent to key management device 204. At 266, key management device 204 may authenticate the validator cold storage device and use group mapping information (for example, as shown in Table 2), to look up the group associated with the validator cold storage device authentication information (such as the validator cold storage device ID, which may be the public key or based on (e.g., a hash of) the public key of the key pair 119 of the validator cold storage device 208, or some other unique ID.

From the group mapping information, key management device 204 can determine if the validator computing device 212 is authorized to make a restoration request, for example, by verifying the provided user ID is listed in the group mapping information as a validator. The key management device 204 can also identify the users in the group and, at 268, the key management device can prompt or otherwise notify the validator computing device 212, such as via a user interface on a web browser of the validator computing device 212, of the remaining users 103 that must connect their cold storage devices 206 to obtain the subkeys 116 required to restore the asset private key 110. In examples where the validator has access to all of the first cold storage devices 206, at 270, the validator can connect each cold storage device 206 to the validator computing device, provide a public key, e.g., the public key of the validator key pair 127 to the cold storage device 206 and the cold storage device 206 can decrypt the encrypted subkeys 116 stored on the cold storage device, re-encrypt the subkey with the validator public key and send the encrypted subkey 116 to the validator computing device. In other examples, each user 103 can connect his or her cold storage device 206 to his or her user computing device 102 and securely transfer his or her subkeys 116 to the validator computing device 212.

At step 272, the validator computing device, e.g., with instructions received by key management device 204 and executed in a web browser, can compare the received and decrypted subkeys 116 to the minimum threshold, T, of subkeys required to restore the asset private key 110 and verify the number of received subkeys is equal to T minus the number of validator subkeys 125, thereby indicating the validator will be able to restore the asset private key once the validator subkeys are obtained.

At 274, the validator computing device 212 can notify the key management device 204 that all of the first portion 122 of subkeys from the users have been received, which may include information on the received first portion of subkeys, such as cold storage device ID from which they were obtained and a hash of the subkeys 116. At 276, key management device 204 can compare the information received at step 274 with the group mapping information stored in database 120 and upon verifying a match, at 278, provide instructions for the validator computing device 212 to restore the asset private key. Restoration of the asset private key may include, at 280, accessing the encrypted validator subkey 128 from the blockchain platform 210. As noted above, in some examples, group mapping information may include blockchain mapping information for determining a storage location on the blockchain platform where the encrypted validator subkey 128 is stored. The blockchain mapping information may be securely stored by key management device 204 so that the encrypted validator subkey 128 can only be accessed after the key management device verifies all required conditions have been met. At 282, the encrypted validator subkey 128 may be decrypted with the private key of the validator key pair 127. As noted above, in some examples, key management device 204 may also securely store the passphrase required to use the validator key pair 127. In such examples, prior to step 282, e.g., at 278, the key management device can securely transfer the passphrase to validator computing device 212 for decrypting the encrypted validator subkey 128. Step 282 may also include executing a restoring algorithm to combine subkeys 116 to restore asset private key 110. The restoring algorithm may be a JavaScript combine function executed in a browser of the validator computing device 212 or other software executed by the validator computing device.

In examples where key management device 204 functions as the validator, steps 260-282 may be modified accordingly. For example, one of users 103 via one of user computing device 102 may connect to the key management device 204 and request that the asset private key 110 be restored. In some examples, any user 103 that had previously received one of the first portion 122 of subkeys 116 may request restoration. In other examples, the initiating user may have specified a specific user as being the only user authorized to request restoration. The requesting user may connect his or her cold storage device 206 to his or her computing device 102 and the cold storage device may be configured with an authentication protocol, such as a FIDO authentication protocol for sending authentication information to the key management device 204. The key management device 204 may authenticate the cold storage device and use group mapping information (for example, as shown in Table 2), to look up the group associated with the cold storage device authentication information to verify the user is authorized to request restoration.

From the group mapping information, key management device 204 can determine the users in the group and prompt the user to connect the cold storage devices 206 of the remaining users required to restore the asset private key 110. Each cold storage device 206 can be directly or indirectly connected to the validator computing device 212 and securely transfer the subkeys 116 stored on the cold storage devices. The validator or restoring user can then, with the validator computing device 212, e.g., with instructions received by key management device 204 and executed in a web browser, can compare the received and decrypted subkeys 116 to the minimum threshold, T, of subkeys required to restore the asset private key 110 and verify the number of received subkeys is equal to T minus the number of validator subkeys 125 and notify the key management device 204 that all or at least a threshold value of the first portion 122 of subkeys from the users have been received. The key management device 204 can compare the information received from the validator computing device 212 with the group mapping information stored in database 120 and upon verifying a match, provide instructions for the validator computing device 212 to restore the asset private key. In examples where validator key pair and passphrase 127 are stored by the key management device 204, the key management device may access the encrypted validator subkey 128 from the blockchain platform 210, decrypt the encrypted validator subkey 128 with the validator private key of the validator key pair 127 stored by the key management device, and securely transfer the validator key(s) 125 to the validator computing device 212. The validator computing device 212 may then execute a restoring algorithm to combine subkeys 116 to restore asset private key 110. The restoring algorithm may be a JavaScript combine function executed in a browser of the validator computing device 212 or other software executed by the validator computing device. Thus, in some examples, automatic restoration of the asset private key can be achieved without requiring the involvement of a third party as validator by selecting the key management device 204 as the validator.

Any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 3:
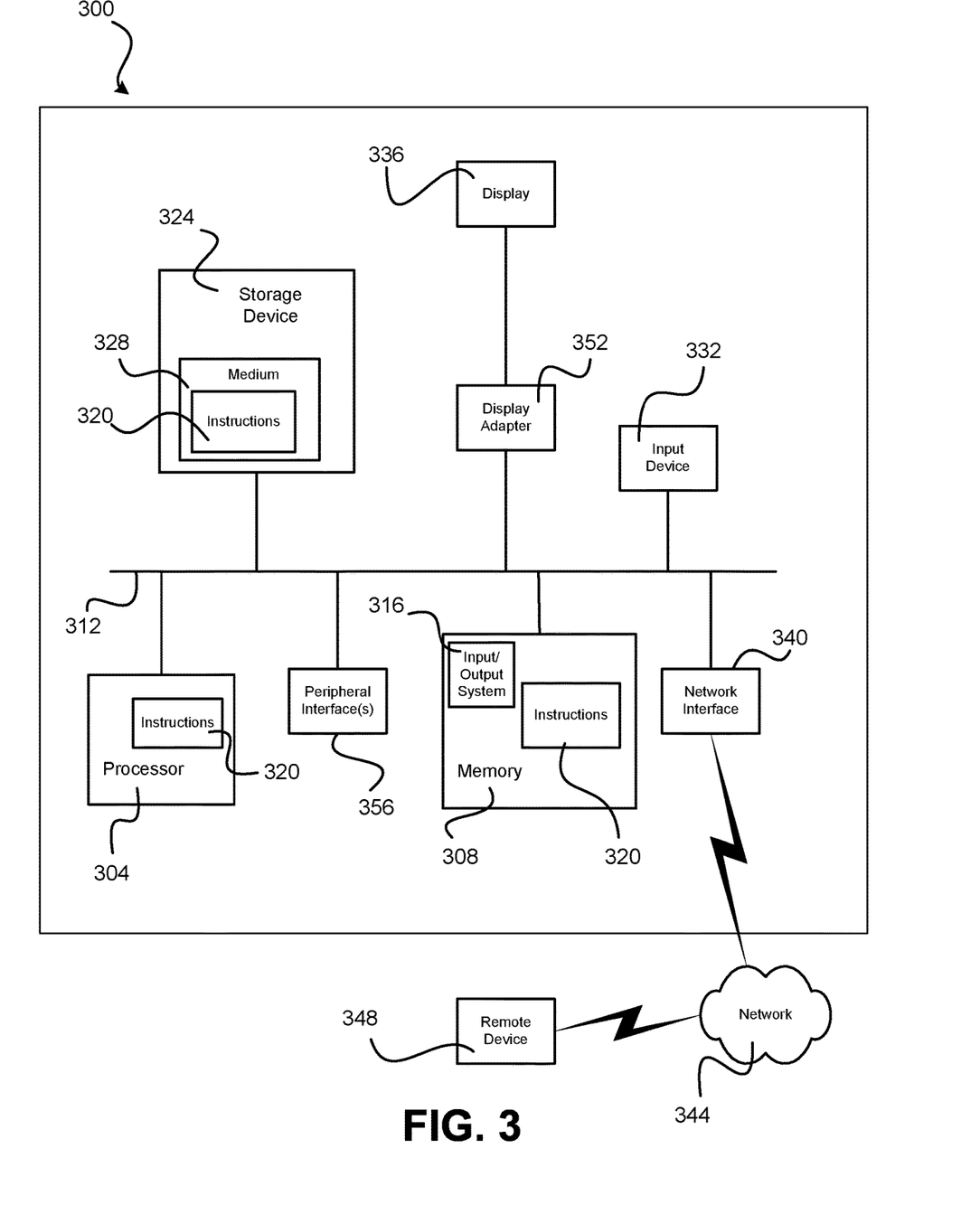
FIG. 3 is a diagrammatic representation of one example of a computing device for performing any one or more of the aspects and/or methodologies of the present disclosure.

FIG. 3 shows a diagrammatic representation of one example of a computing device in the exemplary form of a computer system 300 within which a set of instructions for causing a control system, such as the key management system of FIG. 1, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 300 includes a processor 304 and a memory 308 that communicate with each other, and with other components, via a bus 312. Bus 312 may include any of several types of bus structures including, but not limited to, a memory bus, a memory controller, a peripheral bus, a local bus, and any combinations thereof, using any of a variety of bus architectures.

Memory 308 may include various components (e.g., machine-readable media) including, but not limited to, a random access memory component, a read only component, and any combinations thereof. In one example, a basic input/output system 316 (BIOS), including basic routines that help to transfer information between elements within computer system 300, such as during start-up, may be stored in memory 308. Memory 308 may also include (e.g., stored on one or more machine-readable media) instructions (e.g., software) 320 embodying any one or more of the aspects and/or methodologies of the present disclosure. In another example, memory 308 may further include any number of program modules including, but not limited to, an operating system, one or more application programs, other program modules, program data, and any combinations thereof.

Computer system 300 may also include a storage device 324. Examples of a storage device (e.g., storage device 324) include, but are not limited to, a hard disk drive, a magnetic disk drive, an optical disc drive in combination with an optical medium, a solid-state memory device, and any combinations thereof. Storage device 324 may be connected to bus 312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 324 (or one or more components thereof) may be removably interfaced with computer system 300 (e.g., via an external port connector (not shown)). Particularly, storage device 324 and an associated machine-readable medium 328 may provide nonvolatile and/or volatile storage of machine-readable instructions, data structures, program modules, and/or other data for computer system 300. In one example, software 320 may reside, completely or partially, within machine-readable medium 328. In another example, software 320 may reside, completely or partially, within processor 304.

Computer system 300 may also include an input device 332. In one example, a user of computer system 300 may enter commands and/or other information into computer system 300 via input device 332. Examples of an input device 332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 332 may be interfaced to bus 312 via any of a variety of interfaces (not shown) including, but not limited to, a serial interface, a parallel interface, a game port, a USB interface, a FIREWIRE interface, a direct interface to bus 312, and any combinations thereof. Input device 332 may include a touch screen interface that may be a part of or separate from display 336, discussed further below. Input device 332 may be utilized as a user selection device for selecting one or more graphical representations in a graphical interface as described above.

A user may also input commands and/or other information to computer system 300 via storage device 324 (e.g., a removable disk drive, a flash drive, etc.) and/or network interface device 340. A network interface device, such as network interface device 340, may be utilized for connecting computer system 300 to one or more of a variety of networks, such as network 344, and one or more remote devices 348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 344, may employ a wired and/or a wireless mode of communication. In general, any network topology may be used. Information (e.g., data, software 320, etc.) may be communicated to and/or from computer system 300 via network interface device 340.

Computer system 300 may further include a video display adapter 352 for communicating a displayable image to a display device, such as display device 336. Examples of a display device include, but are not limited to, a liquid crystal display (LCD), a cathode ray tube (CRT), a plasma display, a light emitting diode (LED) display, and any combinations thereof. Display adapter 352 and display device 336 may be utilized in combination with processor 304 to provide graphical representations of aspects of the present disclosure. In addition to a display device, computer system 300 may include one or more other peripheral output devices including, but not limited to, an audio speaker, a printer, and any combinations thereof. Such peripheral output devices may be connected to bus 312 via a peripheral interface 356. Examples of a peripheral interface include, but are not limited to, a serial port, a USB connection, a FIREWIRE connection, a parallel connection, and any combinations thereof.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

What is claimed is:

1. A method for transferring control of an asset private key from an initiating user to a group of one or more users by use of a key management system, the key management system including a key management computing device configured to provide a web-based key management service and an initiating user computing device, the method comprising:

splitting, with the initiating user computing device, the asset private key into a plurality of subkeys;

defining a threshold number, T, of the subkeys that are required to restore the asset private key;

identifying a first portion of the subkeys to be transferred to the group of one or more users, wherein a number of the subkeys in the first portion is less than T;

identifying at least one of the subkeys as a validator subkey;

randomly generating, with the initiating user computing device, a validator private key;

encrypting the validator subkey with the validator private key to generate an encrypted validator subkey;

transmitting, to the key management system, the encrypted validator subkey for storage by the key management system on a storage system;

storing the first portion of the subkeys on at least one storage device for transfer to the group of one or more users; and storing the validator private key on a validator storage device.

2. The method of claim 1, further comprising:

identifying at least one of the subkeys as a backup subkey;

randomly generating, with the initiating user computing device, a backup private key;

encrypting the backup subkey with the backup private key; and storing the encrypted backup subkey on the storage system.

3. The method of claim 1, wherein the step of randomly generating the validator private key further includes generating a passphrase for encrypting the validator private key, the method further comprising transferring the passphrase to the key management computing device for storage.

4. The method of claim 3, wherein the step of storing the validator private key on a validator storage device includes communicatively coupling a validator cold storage device to the initiating user computing device and transferring the validator private key to the validator cold storage device for secure long term storage by one of the group of users or a trusted third party.

5. The method of claim 1, wherein the step of storing the encrypted validator subkey on a storage system includes storing a unique ID with the encrypted validator subkey on the storage system, the method further comprising storing, in a storage medium of the key management device, group mapping information that includes the unique ID for determining a location in the storage system where the encrypted validator subkey is stored, wherein the key management device securely stores the group mapping information and does not transfer the group mapping information to the initiating user device or other entity to thereby prevent third parties from locating the encrypted validator subkey on the storage system.

6. The method of claim 1, further comprising, executing a web browser software program with the initiating user computing device to communicate with the key management system over a network, wherein the step of splitting is performed with the web browser software program according to instructions received from the key management device.

7. The method of claim 1, wherein the at least one storage device is an encrypted cold storage device.

8. The method of claim 7, wherein the encrypted cold storage device is configured to communicate with the initiating user computing device and key management device according to a FIDO protocol and transfer the subkeys between the cold storage device and initiating user computing device via a transport layer of the FIDO protocol.

9. The method of claim 1, wherein a number of the subkeys transferred to each user in the group of users is greater than a number of the at least one subkey identified as the validator subkey(s).

10. The method of claim 1, further comprising selecting, via a web browser of the initiating user computing device, a key management plan;
   wherein the step of storing the validator private key on a validator storage device includes transferring the validator private key to the key management device if a first key management plan is selected or to a cold storage device communicatively coupled to the initiating computing device if a second key management plan is selected.

11. The method of claim 10, wherein the first key management plan includes automatic restoration of the asset private key when the key management device receives an authorized restoration request.

12. The method of claim 10, wherein the second key management plan includes verification by one of the users in the group of users or a trusted third party that a specified condition has been met prior to restoration of the asset private key.

13. The method of claim 12, wherein the specified condition includes one of verification of death or incapacitance, a transfer of ownership, or a request from a minimum number of the group of users to restore the asset private key.

14. The method of claim 1, further comprising:
   sending, via a web browser of a validator computing device, a restoration request to the key management device;
   receiving, at the validator computing device, the encrypted validator subkey; and
   restoring, with a restoring algorithm executed in the web browser of the validator computing device, the asset private key from the first portion of the subkeys and the validator subkey.

15. The method of claim 14, wherein the encrypted validator subkey is obtained from the storage system by the key management device and transmitted from the key management device to the validator computing device.

16. The method of claim 15, wherein the encrypted validator subkey is obtained from the storage system by the key management device by accessing blockchain mapping information securely stored by the key management device to determine a storage location of the encrypted validator subkey on the storage system.

17. The method of claim 1, wherein the storage system is a blockchain platform.

18. The method of claim 1, wherein the storage system is a peer-to-peer network.

19. The method of claim 1, wherein the asset private key is a cryptographic key, seed, passphrase, or any other digital data.

20. A method of providing a key management service with a key management device for transferring control of an asset private key, the method comprising:
   receiving, at the key management device, an asset private key splitting request from an initiating user computing device; and
   sending, from the key management device to the initiating user computing device, key splitting instructions for execution in a web browser of the initiating user computing device, wherein the key splitting instructions include:
      splitting the asset private key into a plurality of subkeys with a key splitting algorithm;
      identifying a first portion of the subkeys for distribution to one or more users, wherein the first portion does not include a sufficient number of the subkeys to restore the asset private key;
      identifying a second portion of the subkeys, the second portion including at least one validator subkey;
      storing ones of the first portion of the subkeys on at least one storage device for transfer to the one or more users;
      randomly generating a validator asymmetric public-private key pair and passphrase;
      encrypting the at least one validator subkey with the validator private key; and
      transmitting the at least one encrypted validator subkey to the key management device for storage on a storage system;
   wherein the asset private key is a cryptographic key, seed, passphrase, or any other digital data.

21. The method of claim 20, further comprising transmitting, from the key management device, the at least one encrypted validator subkey to the storage system for storage.

22. The method of claim 20, wherein the splitting instructions further include transmitting the validator asymmetric public-private key pair to the key management device for storage by the key management device.

23. The method of claim 20, wherein the splitting instructions further include transmitting the validator asymmetric public-private key pair to a cold storage device communicatively coupled to the initiating user computing device for storage.

24. The method of claim 23, wherein the splitting instructions further include transferring the passphrase to the key management device for storage by the key management device in memory.

25. A method of restoring an asset private key from a plurality of subkeys, comprising:
   sending, with a validator computing device, a restoration request to a key management device to restore the asset private key from the plurality of subkeys;
   sending, with the validator computing device, confirmation to the key management device that the validator computing device has access to a first number of the subkeys, wherein the first number is a sufficient number of the subkeys to restore the asset private key when the first number of subkeys are combined with at least one validator subkey;
   receiving, at the validator computing device, from the key management device, the at least one validator subkey; and
   restoring, with a restoring algorithm executed by the validator computing device, the asset private key from the first number of the subkeys and the validator subkey;
   wherein the at least one validator subkey is required to restore the asset private key, wherein the key management device stores an encrypted version of the validator subkey on a storage system and uses mapping information securely stored by the key management device to locate and accesses the encrypted version of the validator subkey in response to receiving the restoration request and confirmation from the validator computing device;
   wherein the asset private key is a cryptographic key, seed, passphrase, or any other digital data.

26. The method of claim 25, further comprising, at the validator computing device, sequentially connecting to a plurality of cold storage devices and downloading ones of the first number of the subkeys from each of the cold storage devices.

27. The method of claim 25, wherein the key management device decrypts the encrypted validator subkey with a passphrase and private key stored in key management device memory.

28. The method of claim 25, wherein the validator subkey received from the key management device is encrypted, the method further comprising, at the validator computing device:
   connecting to a cold storage device and accessing a validator private key stored on the cold storage device; and
   decrypting the encrypted validator subkey with the validator private key.

29. The method of claim 28, the method further comprising receiving at the validator computing device from the key management device a passphrase for decrypting the validator private key.

30. A method of providing a key management service with a key management device for restoring an asset private key from a plurality of subkeys, the method comprising:
   receiving, at the key management device, a restoration request from a validator computing device to restore the asset private key from the plurality of subkeys, the restoration request including a user ID;
   receiving, from the validator computing device, subkey information for confirming the validator computing device has access to a first number of the subkeys;
   accessing, with the key management device, group mapping information associated with the user ID;
   determining whether the group mapping information matches the received subkey information;
   accessing at least one validator subkey and sending the at least one validator subkey to the validator computing device in response to determining the group mapping information matches the received subkey information; and
   sending instructions to the validator computing device for restoring the asset private key;
   wherein the at least one validator subkey is required to restore the asset private key, wherein the accessing the at least one validator subkey includes using the group mapping information for locating and accessing an encrypted version of the at least one validator subkey from a storage system;
   wherein the asset private key is a cryptographic key, seed, passphrase, or any other digital data.

31. The method of claim 30, wherein the instructions further include instructing the validator computing device to sequentially connect to a plurality of cold storage devices and download ones of the first number of the subkeys from each of the cold storage devices.

32. The method of claim 30, further comprising, at the key management device, decrypting the encrypted validator subkey with a passphrase and private key stored in key management device memory.

33. The method of claim 30, wherein the instructions further include instructing the validator computing device to:
   connect to a cold storage device and access a validator private key stored on the cold storage device; and
   decrypt the encrypted validator subkey with the validator private key.

34. The method of claim 33, further comprising sending a passphrase to the validator computing device for decrypting the validator private key.

* * * * *